C. F. BURKHART.
COIN CONTROLLED MECHANISM.
APPLICATION FILED JUNE 4, 1907.

916,838.

Patented Mar. 30, 1909.
9 SHEETS—SHEET 2.

Witnesses:
J. M. Fowler Jr
A. S. Kitchin.

Charles F. Burkhart
Inventor
By Mason, Fenwick & Lawrence Attorneys.

C. F. BURKHART.
COIN CONTROLLED MECHANISM.
APPLICATION FILED JUNE 4, 1907.

916,838.

Patented Mar. 30, 1909.
9 SHEETS—SHEET 7.

Witnesses
P. M. Fowler Jr.
O. S. Kitchin

Charles F. Burkhart, Inventor.
By Mason, Fenwick & Lawrence Attorneys.

C. F. BURKHART.
COIN CONTROLLED MECHANISM.
APPLICATION FILED JUNE 4, 1907.

916,838.

Patented Mar. 30, 1909.
9 SHEETS—SHEET 8.

Fig. 9.

UNITED STATES PATENT OFFICE.

CHARLES F. BURKHART, OF BUFFALO, NEW YORK.

COIN-CONTROLLED MECHANISM.

No. 916,838.    Specification of Letters Patent.    Patented March 30, 1909.

Application filed June 4, 1907. Serial No. 377,209.

*To all whom it may concern:*

Be it known that I, CHARLES F. BURKHART, a citizen of the United States, residing at Buffalo, in the county of Erie and State of New York, have invented certain new and useful Improvements in Coin - Controlled Mechanism; and I do hereby declare the following to be a full, clear, and exact description of the invention, such as will enable others skilled in the art to which it appertains to make and use the same.

This invention relates to improvements in coin controlled devices, and one of the objects in view is the provision of controlling means for a mechanism, which mechanism is adapted to carry out two complete cycles of operation upon the introduction of a single coin, means being provided for interrupting the operation of such mechanism at the conclusion of one cycle and preceding the beginning of the next, such interrupting means being adapted to be manipulated by the operator without the introduction of a second coin for starting the second cycle.

With this and other objects in view, one embodiment of the present invention comprehends a shoe polishing mechanism, means for actuating the same for accomplishing the shoe polishing operation thereof, said actuating means being adapted to be started upon the introduction of a coin, means controlled by said shoe polishing mechanism for interrupting the operation of said actuating means at the conclusion of one complete operation of the shoe polishing mechanism, and means within the control of the operator for again starting the actuating means.

A more specific embodiment of the invention comprehends the combination with a coin controlled electric circuit, of a motor interposed in said circuit, shoe polishing means arranged to be operated by said motor and adapted to have a complete operation upon the introduction of a coin, means governed by the shoe polishing means for interrupting the said circuit at the conclusion of an operation of the shoe polishing means, and means within the control of the operator for closing the circuit after such interruption.

A still more specific embodiment of the present invention comprises the combination with shoe polishing mechanism, of a motor for operating the same, a circuit for the motor adapted to be closed by the introduction of a coin, and to be broken when the coin is released, means for maintaining said coin against release during two complete operations of the shoe polishing, means for interrupting the circuit at the conclusion of one complete operation of the shoe polishing mechanism and prior to the beginning of the second operation, means within the control of the operator for closing the circuit without the introduction of a second coin, and means for releasing the introduced coin at the termination of the second complete operation of the shoe polishing mechanism.

The invention also comprises certain other novel constructions, combinations and arrangement of parts as will be hereinafter fully described and claimed.

In the accompanying drawings.

While the present invention is adapted for use in conjunction with any device involving mechanism designed to be coin controlled, I find it especially well adapted for use in conjunction with my improved shoe polishing mechanism as fully disclosed in my application for Letters Patent filed September 18, 1906, and designated by Serial No. 335,310, and in my divisional application filed March 29, 1907, and designated by Serial No. 365294. In view of this fact, I have illustrated the present invention as operating in conjunction with the carriage of the said shoe polishing mechanism, but it will be at once obvious that the present invention is not limited to the particular mechanism in conjunction with which it may be used.

Referring to the drawing by numerals. 1 indicates a carriage or frame mounted to reciprocate and may be employed for any purpose whatever, but for the purposes of illustration the said frame or carriage indicates a part of the shoe polishing mechanism above referred to. Said carriage is supported by carrying wheels 2, 2 mounted upon suitable rails 3, 3, and the carriage is driven by a motor 4 through any preferred power transmitting mechanism not illustrated, the driving mechanism being such as to produce reciprocation of the carriage. The carriage and its actuating mechanism are arranged within the casing or cabinet 5' of any preferred type. A coin slot or chute 6 has its upper end opening outwardly through a plate 5 fixed in the front face of the cabinet 5'. The chute 6 extends within the casing, downwardly and discharges above a receiving chute 7, which latter chute empties into a coin receptacle 8 of any preferred type. The front face of the plate 5 is formed with a segmental slot 9 through which projects an operating handle 10 of a coin release lever 11. The lever 11 is pivoted, as at 12, to the inside of the plate 5, and is sustained with the operating handle 10 in its uppermost position by a spring 13, which at one end engages the lever 11 between the pivot point 12 and the handle 10, and at the other end engages the plate 5. A detent finger 14 is fixed to the lever 11 immediately above the pivot point 12, and extends upwardly therefrom, and is bent into the form of a hook with the outer end projecting through an aperture 15 in the wall of chute 6, into the chute 6 a sufficient distance for normally preventing the passage of a coin. The said finger 14 has its free end normally resting upon the inner surface of the wall of the chute 6 and thus forms a limit to the upward movement of the lever 11 under the action of spring 13.

A lever 16 is vertically disposed and pivoted, as at 17, to the plate 5 and has its upper end extending across the inner end of the lever 11, a hook 18 being formed at the upper end of the lever 16 in position for at times engaging the inner end of the lever 11 for preventing upward movement of such inner end. The lever 16 is engaged by one end of a spring 19, the opposite end of said spring being fixed to a bracket 20 secured to the plate 5. The spring 19 is positioned for normally retaining the lever 16 with its hook 18 out of engagement with the inner end of the lever 11. The end of the lever 16 below the pivot 17 is provided with an armature 21 disposed opposite the end of the core 22 of an electro magnet 23.

Figure 9:
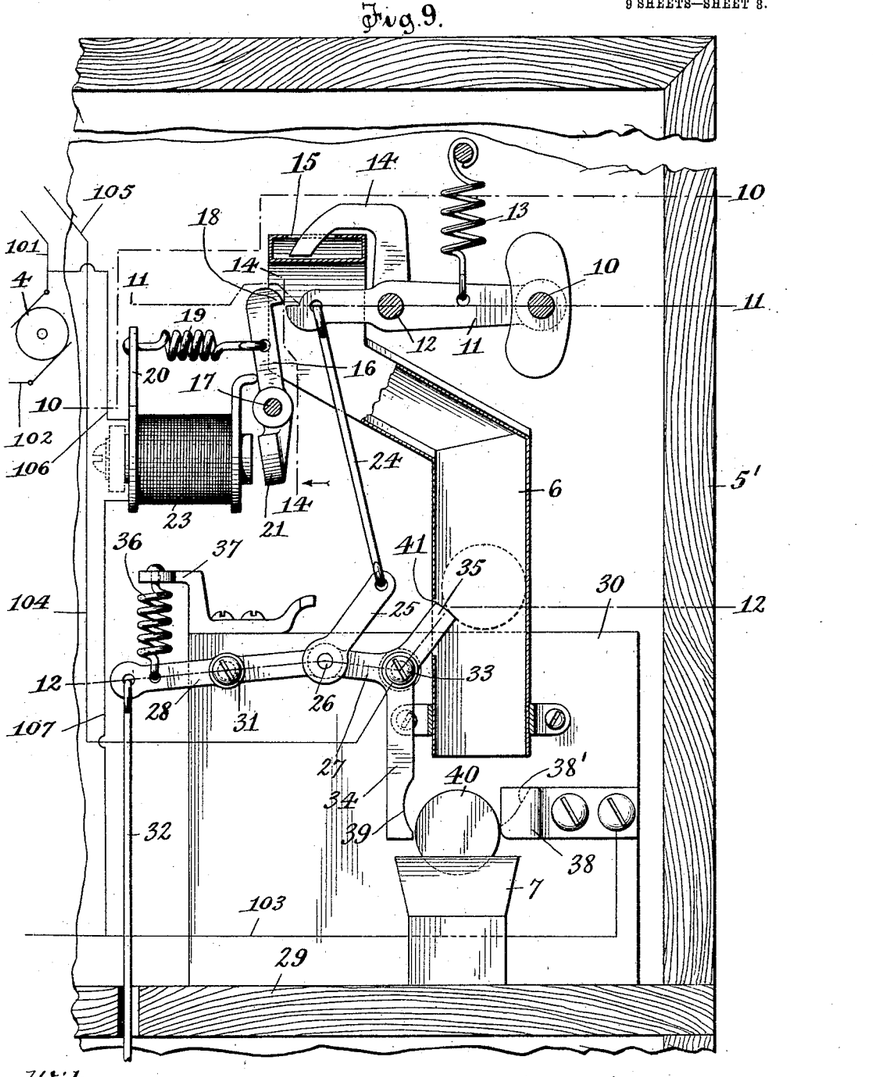
Fig. 9 is an enlarged view in side elevation, parts being shown in section, of the coin retaining and releasing mechanism.
Figure 10:
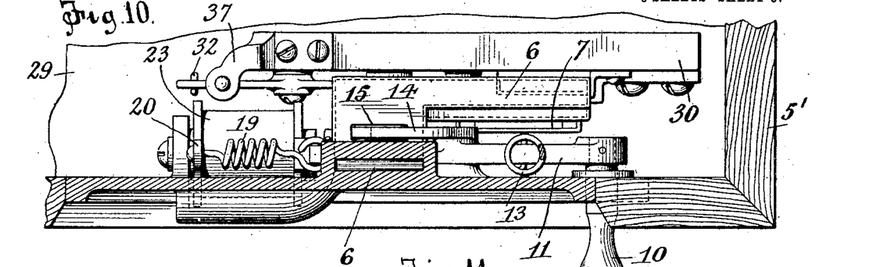
Fig. 10 is a horizontal section taken on the planes indicated by line 10, 10 of Fig. 9, and looking downwardly.
Figure 11:
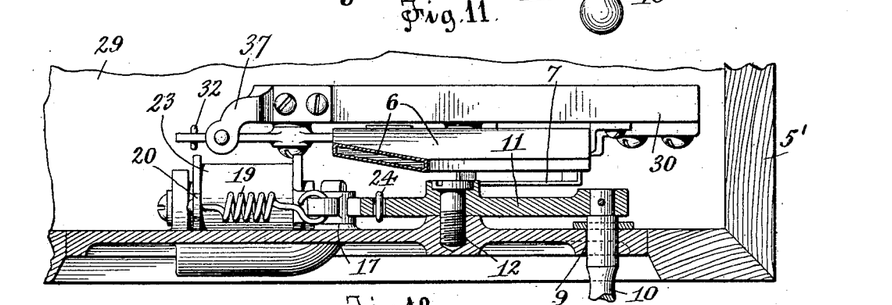
Fig. 11 is a similar section taken on the planes indicated by line 11, 11 of Fig. 9.
Figure 12:
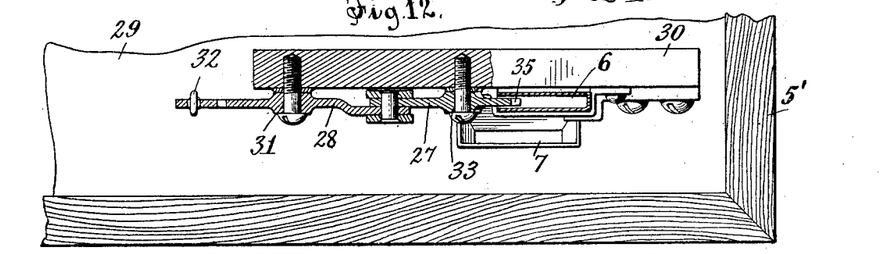
Fig. 12 is a similar view taken on the planes indicated by line 12, 12 of Fig. 9.
Figure 13:
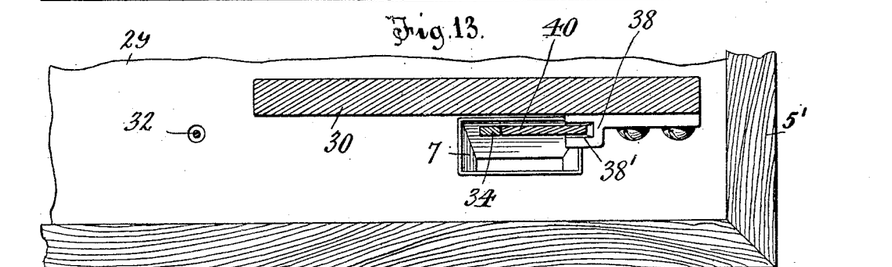
Fig. 13 is an enlarged horizontal section taken on the plane indicated by line 13, 13 of Fig. 2, and looking downwardly.
Figure 18:
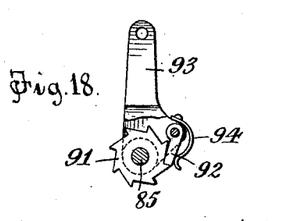
Fig. 18 is a detail view partly in section and partly in elevation of the lever and ratchet device for actuating the shaft of the switch throwing cam.
Figure 19:
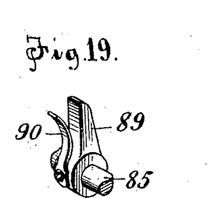
Fig. 19 is a detail, perspective view of one of the cam actuating fingers and springs, a fragment of the shaft being shown.

A link 24 engages and is sustained from an eye formed at the inner end of the lever 11, and the said link at its lower end loosely engages a second link 25. The link 25 at its lower end pivotally engages a pivot pin 26, which pivot pin engages the inner end of a lever 27, and the outer end of a lever 28. The cabinet 5' is preferably provided with a horizontal partition wall 29 upon which is secured a vertical plate 30 spaced from the front wall of the cabinet 5'. The lever 28 is pivoted intermediate its length as at 31, to the plate 30 and at its inner end is engaged by a vertically depending rod or link 32 which extends downwardly through the partition wall 29, and is connected with mechanism hereinafter described. The lever 27 is pivoted, as at 33, to the plate 30, and at the point of such pivot branches into a depending arm 34 and an upwardly and outwardly extending arm 35. A spring 36 is fixed at one end to a bracket 37 carried by the block 30, and at its opposite end the said spring engages the inner end of the lever 28 for normally holding such end in its uppermost position, whereby the arm 34, which extends below the lower end of the chute 6 is normally retained in the inclined position indicated in Fig. 2 with its lower end extending beneath the lower end of the chute 6 in position for interrupting the discharge of a coin or other article therefrom. A retaining bracket 38 is fixed to the block 30 and extends into the path of movement of a coin dropping from the chute 6. The said bracket 38 is formed with a notch 38', as seen best in Fig. 13, and also as seen in dots in Fig. 9, adapted to receive one edge of the coin. The lower end of the lever 34 is formed with a grooved notch 39 adapted to receive the opposite edge of the coin from that engaging within the notch 38'. Thus when the parts are in the position indicated in Figs. 2 and 13, a coin, as seen at 40, dropping from the chute 6 will strike the bracket 37 within the notch 38' and lie between said bracket and the lever 34 until the lever is moved to the position indicated in Fig. 9, as will be hereinafter fully described, whereupon the coin 40 will drop into the chute 7. The chute 6 is formed with a notch 41 opposite the free end of the arm 35 and the said arm is so positioned that when the parts are operated for moving the arm 34 inwardly for releasing the coin 40, the arm 35 will have its upper end moved outwardly through the aperture 41 into the chute 6 in position for preventing the dropping of a coin through the chute so long as the arm 34 is not in a position to catch and retain such coin. Thus the arms 34 and 35 alternately guard the chute 6 so as to prevent successive discharges therefrom without interruption.

The rod or link 32 extends through an aperture in the partition 29, and extends through an aperture in the horizontal portion of the upper end of a plunger 42 in position for being free to descend independently of the said plunger and formed with a head 43 adapted to be engaged by the plunger when the plunger is moved downwardly so that the rod 32 will be pulled downwardly when the plunger 42 is pulled downwardly, while said rod 32 is free to move downwardly independently of any movement of the plunger 42. The plunger 42 extends through a guiding bracket 44 fixed to one of the walls of the casing 5' and near its lower end is preferably squared, as at 44', and extends into a squared guiding socket 45. A sleeve 46 surrounds the plunger 42 and is movable longitudinally of the squared portion 44 as well as of a portion of the remainder of the plunger. A coiled spring 47 surrounds the plunger 42 and is interposed between the bracket 44 and the sleeve 46 in position for normally forcing the sleeve 46 downwardly. The sleeve 46 is provided at one side with a pair of ears 48 spaced apart, and a pawl 49 is pivotally retained between said ears by a bolt or rivet 50 passed through the ears and the end of the pawl 49.

A spring 51 is fixed at its upper end to the sleeve 46 and engages the outer edge of the pawl 49 at its lower end in position for forcing the pawl inwardly toward the plunger 42. The pawl 49 is provided intermediate its length with a tooth or projection 52 adapted at times to engage a notch 52' formed in the squared portion 44'. The pawl 49 is formed at its lower end with a cam surface 53, and the upper end of the socket 45 is formed with an inclined surface or cam 54 positioned for being engaged by the cam 53 of the pawl 49, when the pawl is moved downwardly until its lower end passes the upper end of the socket 45. On the opposite side of the sleeve 46 from the pawl 49, and preferably formed integral with the sleeve, is a lug or projection 55, which extends into the path of movement of the free end of a finger or arm 56. Said arm 56 is fixed to a shaft 57, which shaft is journaled in brackets 58, 58 suitably mounted in the casing or cabinet 5'. The inner end of the shaft 57 is loosely engaged by a bifurcated lever 59, which lever carries a pivoted pawl 60 engaged by a spring 61, which presses the pawl into engagement with the periphery of a ratchet wheel 62, said ratchet wheel being arranged between the arms of the bifurcation of the lever 59 and being fixed to the shaft 57. Thus it will be seen that if the lever 59 is swung back and forth, the pawl 60 will be caused to successively engage the teeth of the ratchet wheel 62 and rotate the said ratchet wheel with a step by step movement, the arm 56 being correspondingly moved. The upper end of the lever 59 is pivotally engaged by the bifurcated end of a link 63, which link is bifurcated at its opposite end and pivotally engages the upper end of an operating lever 64. The lever 64 is pivotally supported on a bracket 65, and has its upper end extending into the path of movement of lugs 66 and 67 projecting laterally from one of the sides of the carriage 1. The lugs 66 and 67 are spaced apart a distance equal substantially to the distance of travel of the carriage 1, so that when the carriage 1 moves in one direction the lug 66 will strike the upper end of the lever 64 and force the same inwardly, and when the carriage travels in the opposite direction the lug 67 will strike the upper end of the lever 64 and force the same rearwardly, the lug 67 being positioned on the carriage 1 at a point higher than the lug 66 so that lug 67 may pass part way over the upper end of the lever 64 when the carriage 1 moves rearwardly. It is to be observed that the amount of movement of the lever 64, and consequently of the lever 59 is limited by the shoulder at the termination of the bifurcation of that end of link 63 which engages the lever 64 so that there is no danger of the lever 64 being accidentally thrown beyond the desired point by momentum.

Figure 20:
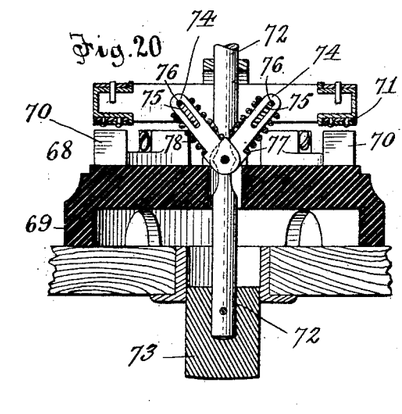
Fig. 20 is an enlarged, detail section of the switch taken on the planes indicated by line 20, 20 of Fig. 5, the switch being seen in its open position.
Figure 21:
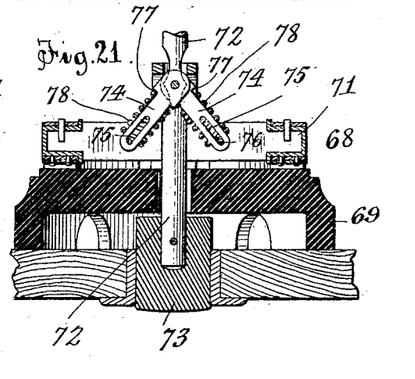
Fig. 21 is a similar view of the same taken on the plane indicated by line 21, 21, of Fig. 4, the switch being seen in its closed position.

A switch 68 is interposed in the circuit of the motor 4, as will be hereinafter fully pointed out, and the said switch is preferably disposed in the cabinet or casing 5' on the opposite side of the carriage 1 from the coin chute 6. As best seen in Figs. 20 and 21, the switch 68 is of the type known as the Bryant switch, and consists principally of an insulating block 69 supporting contact plates 70, 70, adapted to be engaged by the conducting springs of the shiftable switch member 71. A shaft 72 extends through the shiftable switch member 71, through the block 69 (which block is secured to the inner face of the cabinet 5'), and through the wall of the cabinet 5'. A push button 73 is fixed to the outer end of the shaft 72 in position for being readily manipulated by the hand of the operator.

Links 74, 74 are pivoted o the shaft 72 and are formed with longitudinal slots 75, 75 near their outer ends and through the said slots 75 extend pins 76, 76, which are rigidly fixed to the shiftable switch member 71. Each of the links 74 is provided near its inner end with a shoulder 77, and a coil spring 78 surrounds each of said links and is interposed between the respective shoulder 77 and the corresponding pin 76, so that the shiftable switch member 71 is forced by the said spring 78 at all times away from the point of the pivot of the links 74. Hence when the shaft 72 is forced outwardly to the position indicated in Fig. 20, the springs will maintain the shiftable member 71 out of contact with the contact spring 70. When the shaft 72 is pressed inwardly by the hand of the operator, the pivot of links 74 will pass the point of alinement with the pins 76, and the pins 76 will then be pressed by springs 78 outwardly. In this position, the springs 78 force the shiftable switch member 71 into contact with the spring 70, as seen in Fig. 21, and maintain the circuit, of which the switch 68 is a part, in a closed condition until the shaft 72 is again forced outwardly to the position indicated in Fig. 20. The switch 68 *per se* is well known on the market, and has been described only for the purpose of making manifest its utility in the present improved combination.

Figures 5, 6:
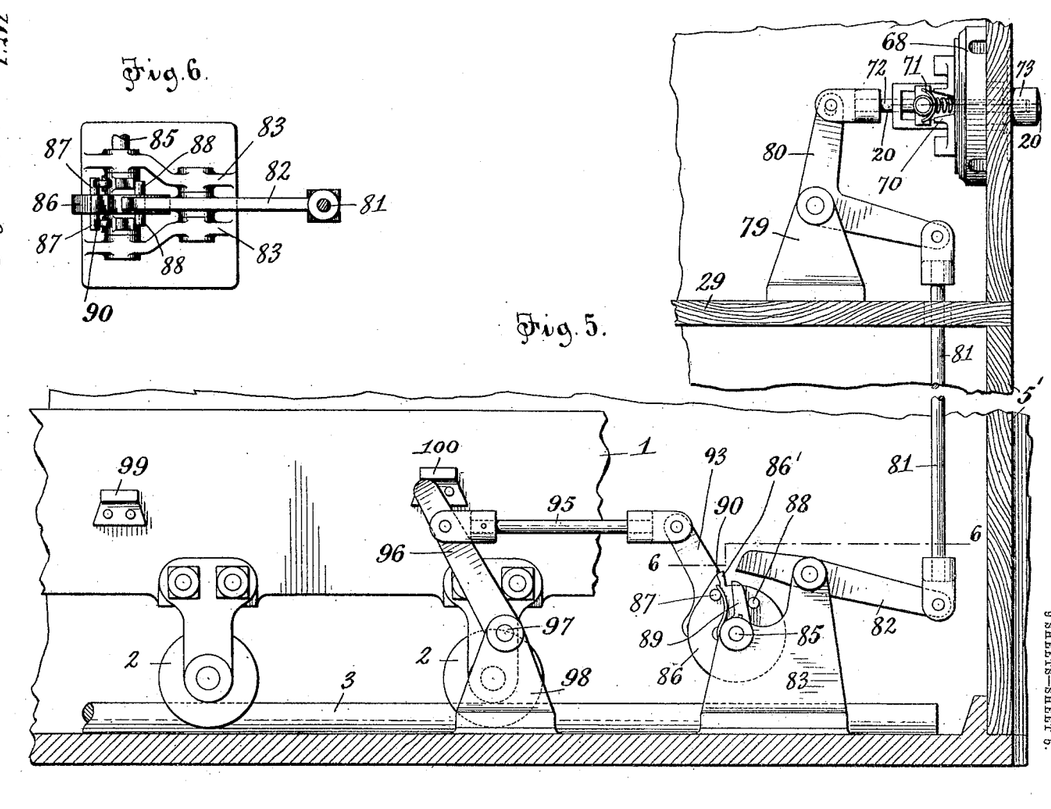
Fig. 5 is a similar view on an enlarged scale of the same with the switch indicated in its open position.
Fig. 6 is a detail, horizontal section taken on the plane indicated by line 6, 6 of Fig. 5 and looking downwardly.
Figures 8, 14, 15, 16, 17:
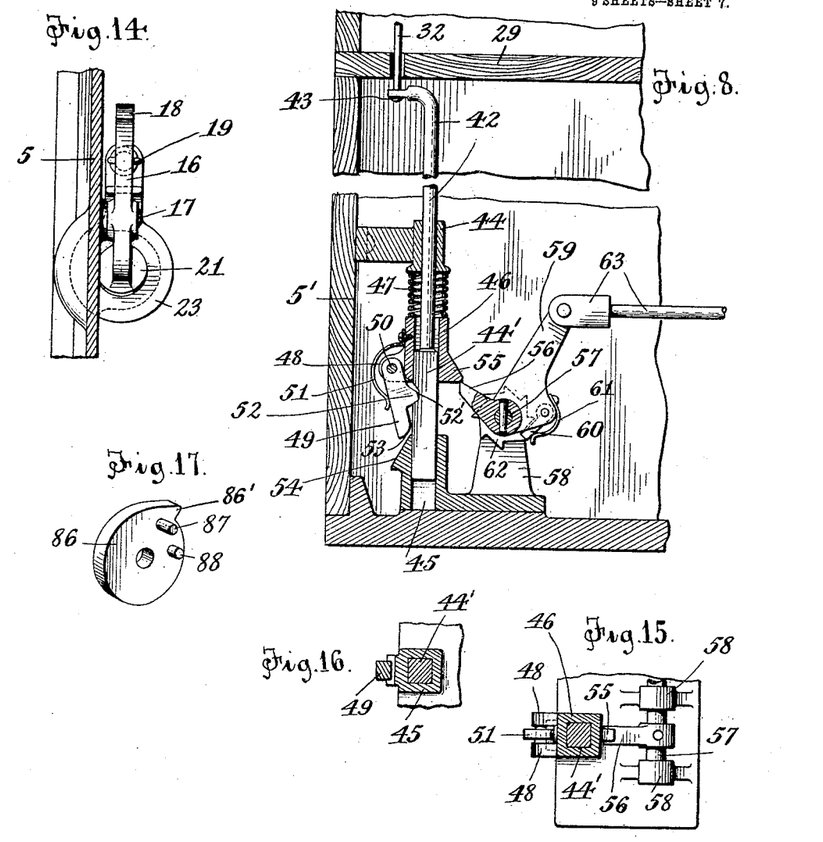
Fig. 8 is an enlarged, detail, fragmentary, vertical section taken longitudinally of the cabinet or casing centrally through the actuating device for the coin releasing mechanism.
Fig. 14 is a fragmentary vertical section taken on the planes indicated by line 14, 14 of Fig. 9, and looking in the direction indicated by the arrow.
Fig. 15 is a horizontal section taken on the planes indicated by line 15, 15 of Fig. 3 and looking downwardly.
Fig. 16 is a similar view taken on the plane indicated by line 16, 16 of Fig. 3.
Fig. 17 is a detail, perspective view of the switch opening cam.

Brackets 79 are mounted upon the partition 29 and are provided with journals for the pivot of a bell crank lever 80, the upper arm of which lever pivotally engages the bifurcated inner end of the shaft 72. The horizontal arm of the lever 80 pivotally engages the bifurcated upper end of a vertically disposed link or rod 81, which link or rod extends downwardly through an aperture in the partition 29 and is bifurcated at its lower end and pivotally engages the front end of an actuating lever 82. The lever 82 is pivoted intermediate its length in brackets 83 mounted on the floor of the casing or cabinet 5'. A bracket 84 is mounted on the floor of the cabinet or casing 5' and spaced from the brackets 83 and arranged near one side of the carriage or frame 1. A shaft 85 is journaled in the brackets 83 and 84 and carries a loose cam between brackets 83. The cam 86, as seen in Figs. 6 and 17, is provided at each side with laterally projecting lugs 87 and 88, between which are arranged operating fingers 89 and springs 90. The fingers 89 are provided at their inner ends with collars surrounding and fixed to the shaft 85. The springs 90 have their inner ends fixed to the respective collars of the fingers 89 so that the said springs and fingers must revolve with the shaft 85 when the said shaft is revolved, and as the said shaft in operation revolves in a direction from the fingers toward the springs, power is usually transmitted from the shaft through the springs to the pins 87, and the cam 86 is thus caused to revolve with the shaft 85. If, however, movement of the cam 86 is resisted by friction or otherwise, the shaft 85 in its revolution will force the fingers 89 up into contact with the springs 90, and will then impart positive movement through the fingers 89 and the pins 87 to the cam 86, the springs 90, of course, at such times only serving as filler plates. Just as soon as the friction or other resistance is removed, the springs 90 will act to throw the cam 86 forwardly and will thus spring away from the fingers 89 until the pins 88 strike the edges of said fingers, the said pins 88 serving to prevent too great separation of the springs from the fingers.

Figure 4:
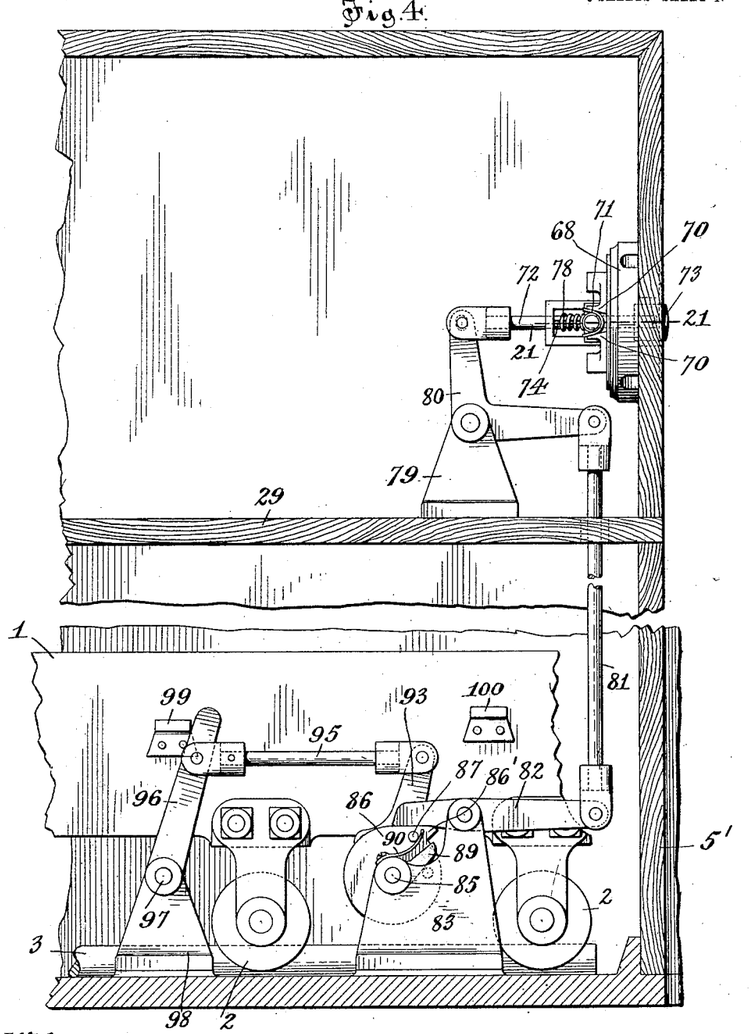
Fig. 4 is a similar view, on an enlarged scale, taken on the plane indicated by line 4, 4 of Fig. 2 and looking in the direction indicated by the arrow, the switch being indicated in its closed position.

The cam 86 is disk-shaped except for a cam projection 86'. The said cam 86 is positioned on the shaft 85 immediately beneath the inner end of the lever 82 in position for having the under edge of said inner end rest upon the cam as indicated in Fig. 4, the springs 78 tending to maintain the inner end of the lever 82 in contact with the periphery of the cam 86, except when the said lever is thrown by the cam to the position indicated in Fig. 5 with the switch in its open condition in which condition the springs 78 serve to retain the inner end of lever 82 out of contact with the periphery of the cam 86. When the switch 68 is closed and the lever 82 is resting upon the periphery of the cam 86, the friction of the contact will increase as the cam projection 86' begins to force the inner end of the lever 82 upwardly, and when the friction is increased to the required extent the outer ends of the fingers 89 will move up against the spring pressure of springs 90 into contact with said springs and will positively force the cam 86 around the shaft until the cam projection 86' has lifted the lever 82 a sufficient distance for causing the pivot point of the links 74 to pass the line of the pin 76. Whereupon, the springs 78, by throwing the shaft 72 outwardly, will lift the inner end of the lever 82 out of contact with the periphery leased, will be thrown forwardly under the action of the springs 90 until the pins 82 contact with the fingers 89. This will insure movement of the cam projection 86' to a point beyond the inner end of the lever 82, so that when the operator undertakes to press the button 73 inwardly, he may accomplish the operation. If provision had not been made for throwing the cam 86 forwardly, as described, it is obvious that the breaking of the circuit by the opening of the switch would have stopped the operation of all the parts and would have left the cam projection 86' beneath the inner end of the lever 82, which would render it impossible to close the switch 68.

Figure 7:
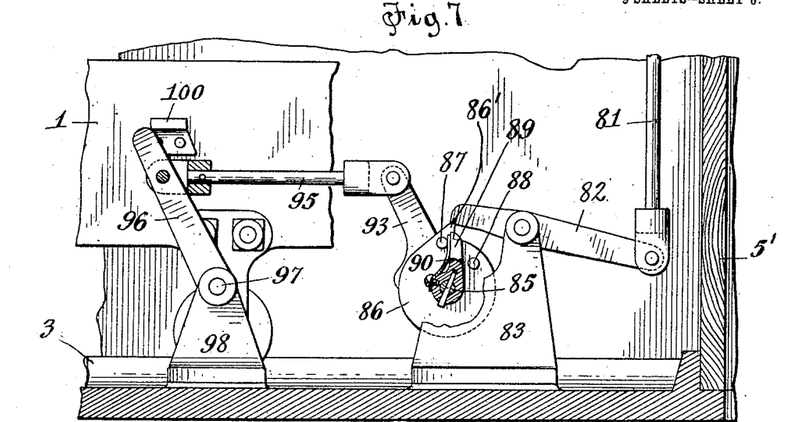
Fig. 7 is an enlarged, detail sectional elevation of some of the switch throwing devices.

The inner end of the shaft 85 fixedly carries a ratchet wheel 91 engaged by a pawl 92 pivoted to a lever 93 and retained in engagement with the ratchet wheel 91 by a spring 94 which is carried by the lever 93. The lever 93 is formed with a bifurcated end pivotally engaging the shaft 85, the ratchet wheel 91 being positioned between the arms of such bifurcation, and the lever 93 at its upper end is engaged by the bifurcated end of a link 95. The opposite end of the link 95 is also bifurcated and pivotally engages the lever 96 near the upper end of said lever. The lower end of the lever 96 is pivoted, as at 97, to a bracket or stand 98 mounted on the floor of the casing 5'. The upper end of the lever 96 extends above the link 95 into the path of movement of lugs 99 and 100, which extend laterally from the side of the carriage 1, and which are spaced apart a distance equal approximately to the distance of travel of the carriage 1, so that when the carriage is moved to the extreme in one direction the lug 99 will strike the lever 96 and swing the same one way, and when the carriage 1 is moved to the extreme of its movement in the opposite direction, the lug 100 will strike the lever 96 and throw the same in the opposite way. The lug 100 is preferably arranged slightly above the horizontal plane of the lug 99 so as to be able to ride over or part way over the upper end of the lever 96, when desired. The bifurcated end of the link 95 which pivotally engages the lever 96, as clearly seen in Fig. 7, presents a shoulder to the edge of the lever, when the lever has been swung a distance sufficient for causing the lever 93 to impart through the pawl 92 one step to the ratchet wheel 91. Thus the lever 96 is prevented from moving for any greater distance than is required for imparting a single step to said ratchet wheel each time the lug 100 engages the lever 96. It is of course obvious that movement imparted from the lug 99 to the lever 96 simply serves to move the pawl 92 back into engagement with the next succeeding tooth of the ratchet wheel 91 after the wheel has been moved forwardly one step. In this connection it will be noted that the lever 93 and its connected parts for imparting the step by step movement to the shaft 85 is an exact duplication of the lever 59 and the connected parts for imparting a step by step movement to the shaft 57. The ratchet wheels 62 and 91 are each provided with eight teeth so that the finger 56 and the lug 86 will complete one revolution with every eight reciprocations of the carriage 1, but for the purpose of timing the operation of the parts, the lug 86' will lift the inner end of the lever 82 for opening the switch 68 at the conclusion of the fourth reciprocation of the carriage 1 after the operation of the parts by the finger 56, and the finger 56 will perform the operation of the parts as hereinafter specified at the termination of the fourth stroke after the opening of the switch by the cam projection 86'. This relation of parts is employed of course by reason of the fact that the carriage 1 requires four reciprocations for accomplishing one complete cycle of operation, and it is obvious that the ratchet wheels 62 and 91 might be changed readily for accomplishing the desired operations in timed relation to a carriage performing a complete cycle of operation with each reciprocation or with two reciprocations or with a greater number of reciprocations, as desired.

Figure 1:
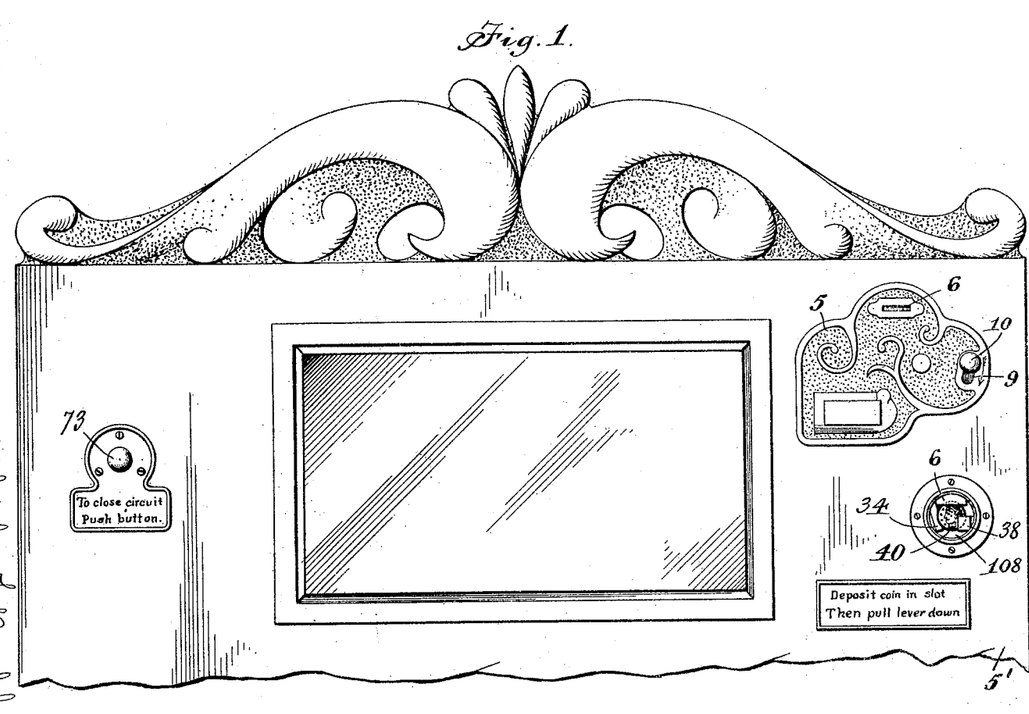
—Figure 1 is a view in front elevation of the upper portion of the cabinet or casing containing the moving parts of the improved mechanism and indicating the relation of certain parts of the mechanism.
Figure 2:
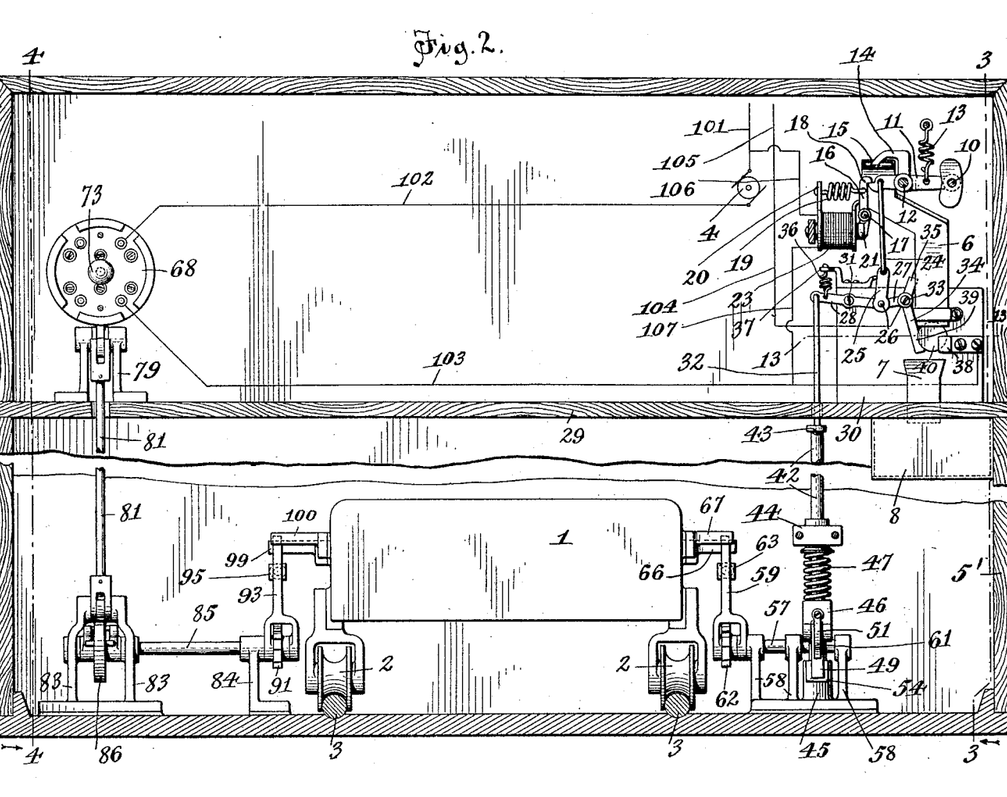
Fig. 2 is a vertical section taken transversely through the cabinet or casing and indicating said mechanism in elevation, the section being taken on the plane indicated by line 2, 2 of Fig. 3, and looking in the direction indicated by the arrow.

In Fig. 2 the circuit for the motor 4 and the circuit for the electric magnet 23 are indicated diagrammatically. The circuit of motor 4 may be traced as follows:—line wire 101 to one brush of motor 4, through motor 4 to the other brush thereof, to conductor 102, to switch 68, to conductor 103, to bracket 38, to coin 40, to arm 34, to conductor 104, to line wire 105. The circuit of the magnet 23 is as follows:—line wire 101 to conductor 106, to winding of magnet 23, to conductor 107, to conductor 103, to bracket 38, to coin 40, to arm 34, to conductor 104 to line 105.

By preference, a transparent plate 108 is arranged in the front of the cabinet 5' immediately in front of the point occupied by the coin 40 when sustained between the arm 34 and the bracket 38. The coin is thus exposed to public view, and it is of course obvious that such publicity will tend to prevent fraudulent use of improper coin.

Figure 3:
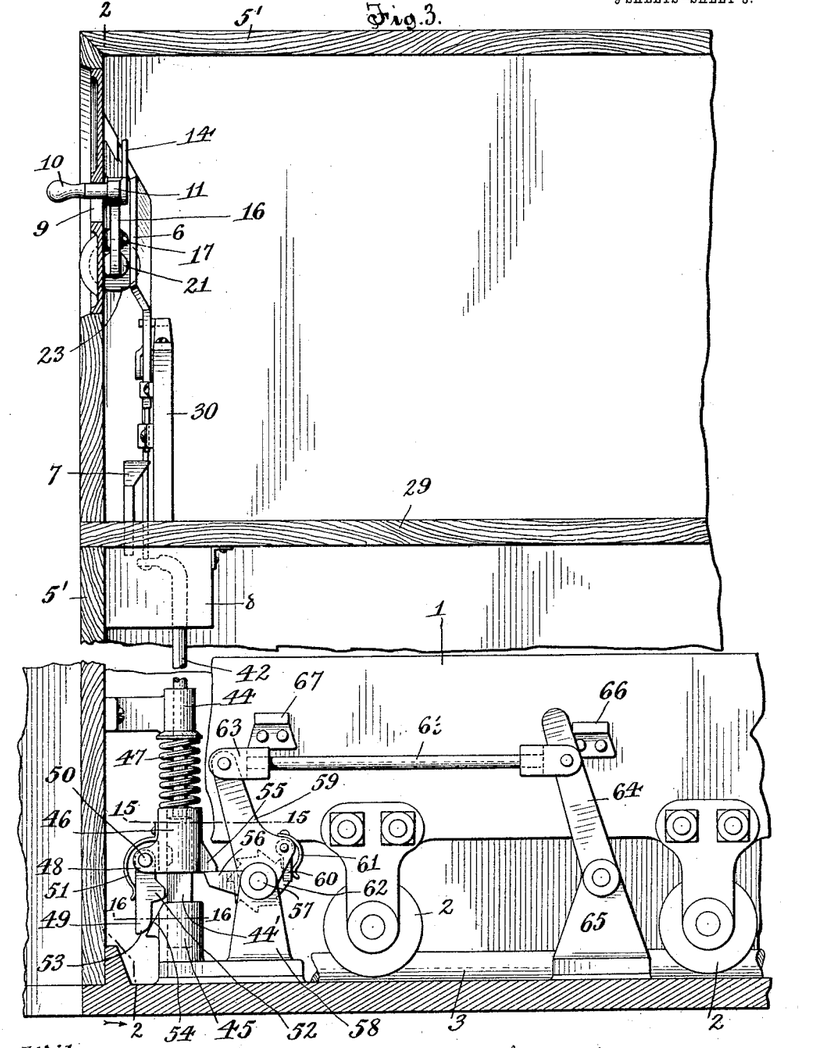
Fig. 3 is an enlarged fragmentary, longitudinal, vertical section taken on the plane indicated by line 3, 3 of Fig. 2, and looking in the direction indicated by the arrow.

In operation, the operator places a coin in the slot 6, and it drops down into contact with the free end of the finger 14, and the operator depresses the handle 10 for permitting the coin to pass on down the chute 6, or the operator may press down the handle 10 before dropping in the coin. The handle 10 is then released for permitting the coin to pass the arm 35, and drop through the chute 6. As the coin emerges from the lower end of the chute 6, it is engaged by the lever arm 34 and the bracket 37 and closes the circuit of motor 34, such circuit having been previously broken by the space between the lever arm 34 and the bracket 38. As the motor 4 operates, the carriage 1 reciprocates, being driven by such motor through mechanism not illustrated. Upon the completion of the fourth reciprocation, the cam projection 86' will have completed a revolution, and just as the carriage is completing its fourth reciprocation the said projection will throw the lever 82 for moving the switch 68 to an open condition; whereupon the button 73 is projected into position for being pressed by the finger of the operator. The completion of the fourth reciprocation of the carriage 1 leaves the finger or crank arm 56 at the point of a one half revolution. The operator next presses inwardly upon the button 73 and thus closes the switch 68 and reestablishes the circuit of the motor 4. The carriage 1 then continues its reciprocations until the fourth one has been completed. As the carriage 1 completes its fourth reciprocation, the finger or crank arm 56 engages the projecting lug 55 of sleeve 46 and raises the said sleeve from the position indicated in Fig. 3 to the position indicated in Fig. 8, at which position the tooth 52 of the pawl 49 is forced by the spring 51 into engagement with the notch 52 of the squared portion 44 of plunger 42. The arm 56 continues its movement until it passes the projection 55; whereupon the spring 47 throws the sleeve 46 downwardly, carrying with it the plunger 42 and drawing down upon the rod 32. As the sleeve 46 descends, the pawl 49 moves downwardly until the cam surface 53 engages the cam surface 54 and the said pawl is moved thereby outwardly against the pressure of spring 51 until tooth 52 leaves notch 52'. Just as soon as the tooth 52 leaves the notch 52', the plunger 42 will be free to move upwardly and will be immediately drawn upwardly by the spring 36, which restores the parts from the condition seen in Fig. 8 to the condition seen in Fig. 3. As rod 32 moves downwardly, it draws down the inner end of the lever 28 and forces up the outer end thereof with the result of moving the lower end of the lever arm 34 inwardly, and releasing the coin 40, permitting the same to drop into the chute 7. The outer end of the lever 28, when thus lifted, forces the lower end of the link 25 upwardly, the link swinging upon its pivot to the position indicated in Fig. 9, its loose connection with link 24 accommodating such upward movement without altering the position of the lever 11. The completion of the eighth reciprocation of the carriage 1 thus releases the coin 40 and leaves the circuit of the motor 4 broken, and leaves the cam projection 86' at the point of one half of a revolution. In the meantime, the depositing of a coin between the lever arm 34 and the bracket 37 closes the circuit of the magnet 23 and the said magnet draws its armature 21 inwardly, and thus projects the hook end portion 18 of the lever 16 above the inner end of the lever 11, which lever is thus prevented from being moved, the hook retaining the outer end of the lever against downward movement, and the finger 14 retaining the outer end of the lever against upward movement. Thus when a coin is in position for closing the circuit of the said magnet 23, the lever 11 may not be manipulated, and therefore it is impossible to pass a second coin through the chute 6 beyond the finger 14. Furthermore, if a wooden check or other non-conducting device is dropped down the chute 6, the failure of such device to close the circuit will leave the lever 11 free to be manipulated, and the downward movement of the handle 10 will cause the inner end of lever 27 to be raised, thus moving the lower end of the lever arm 34 inwardly, and releasing the wooden check. If a coin drops down the chute while the handle 10 is still depressed, it will strike against the arm 35, and therefore may not accidentally pass on down through the chute 6 while the lever arm 34 is out of the path of the coin.

It is obvious, of course, that the two complete cycles of operation governed by a single coin may be of any duration and the carriage 1 may assume any form desired and may have as few or as many reciprocations for the completion of a cycle as are desirable. It is further to be noted that the invention is by no means limited to the reciprocation of the carriage, as any other movement thereof for accomplishing a cycle of operation might be employed for the purposes of this invention.

I have employed the term "coin" throughout this specification and appended claims, and desire the same to be understood as designating money, blanks, checks, and other devices ordinarily employed for releasing the operating means of mechanism commonly known as coin or check control devices. I have furthermore referred specifically to my shoe polishing mechanism, but it is at once obvious that the carriage 1 may be a carriage or moving frame of any mechanism, wherever it is desirable to have two complete cycles of operation controlled by a single coin.

To those familiar with electrical apparatus, it will be obvious that the resistance of the electro magnet 23 must exceed the resistance of the motor 4 as the magnet is shunted across the motor. If the winding of the magnet is not of sufficient resistance, a lamp may be interposed, as is usual in the circuit of the magnet.

What I claim is:—

1. In a mechanism of the class described, the combination with a movable frame, of a motor for actuating the same, a switch interposed in the circuit of said motor, the motor circuit being normally broken and adapted to be closed by a coin, means for sustaining a coin in the circuit, means actuated by the frame for opening the switch, means connected with the switch adapted to be projected, when the switch is opened to a position for being manipulated by the operator for closing the said switch, and means actuated by the frame for releasing the coin.

2. In a mechanism of the class described, the combination with operating mechanism and a motor for actuating the same, of a switch interposed in the circuit of the motor, the circuit of the motor being normally open and being adapted to be closed by a coin, means for sustaining a coin in position for closing the circuit of the motor, means actuated by said operating mechanism for opening the said switch, the switch being adapted to be manually closed, and means actuated by said operating mechanism for releasing the coin in the circuit.

3. In a mechanism of the class described, the combination with a movably mounted frame and an electric motor for moving the same, of a circuit breaking device interposed in the circuit of said motor, a plunger for actuating the same, a sleeve slidable longitudinally of the plunger, a spring normally depressing the sleeve, the sleeve being adapted to be raised against the pressure of the spring, a pawl connected with said sleeve and adapted to engage the plunger when the sleeve is raised for causing the plunger to travel downwardly with the sleeve when the sleeve is lowered, means for raising the sleeve against the pressure of said spring, and then releasing the same, and means for disconnecting the pawl from its engagement with the plunger during the descent of the pawl.

4. In a mechanism of the class described, the combination with a movably mounted frame and an electric motor for operating the same, of circuit breaking means for the circuit of said motor, a plunger for operating said circuit breaking means, a pawl movable longitudinally of the plunger, means normally pressing the pawl into engagement with the plunger, the plunger being formed at one end with a notch adapted to be engaged by the pawl, a spring pressing said pawl in one direction, means for moving the pawl in the other direction against the pressure of the spring for bringing the same into engagement with the notch of said plunger and for then releasing the same, and means for disengaging the pawl from said notch during the movement of the pawl under the action of the spring.

5. In a mechanism of the class described, the combination with a movably mounted frame and an electric motor for actuating the same, of circuit breaking means interposed in the circuit of said motor, a plunger for manipulating said circuit breaking means, a sleeve slidable longitudinally of the plunger, a spring for pressing said sleeve in one direction, an arm for moving the sleeve in the opposite direction, means for actuating the arm for causing the same to move, the sleeve against the pressure of the spring and then releasing the sleeve, a pawl carried by said sleeve, a spring engaging the pawl for pressing the pawl into engagement with the plunger for causing the plunger to travel with the sleeve when the sleeve moves under the action of the first mentioned spring, and means for moving the said pawl out of engagement with the plunger as the sleeve is arriving at the conclusion of its movement under the action of the first mentioned spring.

6. In a mechanism of the class described, the combination with a movably mounted frame and an electric motor for actuating the same, of a circuit breaking device interposed in the circuit of said motor, a plunger for manipulating said circuit breaking device, a pawl movable longitudinally of the plunger and a spring pressing said pawl, means for moving the pawl against the pressure of the spring and then releasing the same, means for pressing the pawl into engagement with the plunger for causing the plunger to travel with the pawl during the travel of the pawl under the action of the spring, and a cam interposed in the path of movement of the pawl for moving the pawl out of engagement with the plunger.

7. In a mechanism of the class described, the combination with operating means and an electric motor for actuating the same, of means for sustaining a coin in position for closing the circuit of the motor, said means being capable of being manipulated for releasing the coin, a rod longitudinally movable for operating the said coin sustaining means for releasing the coin, a plunger engaging said rod, means normally retaining the rod in position for permitting the coin to be sustained by said coin sustaining means, and means for imparting a thrust to the said plunger and then releasing the same for imparting a coin releasing movement to said rod.

8. In a mechanism of the class described, the combination with operating means and an electric motor for actuating the same, of coin sustaining means adapted to sustain a coin in position for closing the circuit of the motor, a rod for manipulating said coin sustaining means for releasing the coin sustained thereby, a spring normally retaining the parts in position for sustaining a coin, a plunger slidingly engaging said rod in such manner as to be capable of exerting a pull thereon against the tension of the spring, and leaving the rod free to be moved independently of the plunger against the tension of the spring, manually operated means for moving said actuating means against the pressure of the spring for moving said rod for manipulating said coin sustaining means, and means for imparting a thrust to said plunger for moving said rod for manipulating the coin sustaining means.

9. In a mechanism of the class described, the combination with operating means and an electric motor for actuating the same, of a lever arm disposed for sustaining the coin in the circuit of the motor for closing the circuit, a rod arranged for swinging said lever arm out of position for sustaining the coin when the rod is moved longitudinally, a spring for normally preventing such movement of said rod, a plunger engaging said rod in position for moving the same longitudinally, when the plunger is moved longitudinally and leaving the rod free to move longitudinally independently of the plunger, means for manually moving said rod longitudinally of the plunger, and means for imparting a longitudinal thrust to said plunger.

10. In a mechanism of the class described, the combination with operating mechanism and an electric motor for actuating the same, of a coin chute, a pivoted lever having an arm adapted to extend into the path of a coin moving through said chute for interrupting the movement of the coin at a point for causing the coin to close the circuit of said motor, a second pivotally mounted lever having one of its arms pivotally connected to an arm of the first mentioned lever, a spring engaging the other arm of said second mentioned lever for normally retaining the first mentioned lever with its coin engaging arm in the path of movement of the coin, means for moving the spring engaged end of said second mentioned lever for releasing the coin, a hand operated lever, and link connections between said hand operated lever and the pivot of the pivoted connected levers for causing the coin retaining arm to be moved out of coin engaging position when the hand operated lever is manipulated.

11. In a mechanism of the class described, the combination with operating mechanism and an electric motor for actuating the same, of a coin chute formed with an aperture at one side, a pivotally mounted lever, a spring engaging the inner end thereof, a pivotally mounted lever having an arm pivotally connected to the outer end of the first mentioned lever, the second mentioned lever being formed with an arm extending through the aperture in said coin chute and adapted to be moved into the path of the coin, said second mentioned lever being formed with another arm adapted to be moved into the path of movement of a coin moving through said chute in alternation with the last mentioned arms, and means engaging the inner end of the first mentioned lever and adapted to be actuated by the said operating mechanism for moving the said lever for swinging the second mentioned lever upon its pivot for causing one of the arms thereof to move out of the path of a coin moving through the coin chute and the other of said arms to move into said path and then swinging the said lever for reversing the relationship of said arms.

12. In a mechanism of the class described, the combination with operating mechanism, and an electric motor for actuating the same, of a coin chute, a pivoted lever having an arm adapted to extend into the path of a coin moving through said chute for interrupting the movement of the coin at a point for causing the coin to close the circuit of said motor, a second pivotally mounted lever having one of its arms pivotally connected to an arm of the first mentioned lever, a spring engaging the other arm of said second mentioned lever for normally retaining the first mentioned lever with its coin engaging arm in the path of movement of the coin, means for moving the spring engaged end of said second mentioned lever for releasing the coin, a hand operated lever, link connections between said hand operated lever and said pivotally connected levers for causing the coin retaining arm to be moved out of coin engaging position when the hand operated lever is manipulated, and an electro magnetic lock for said hand operated lever for locking the same against operation, the circuit of the magnet of said lock being arranged to be closed by a coin retained by the coin retaining arm.

13. In a mechanism of the class described, the combination with operating mechanism, and an electric motor for actuating the same, of a coin chute, a pivoted lever having an arm adapted to extend into the path of a coin moving through said chute for interrupting the movement of the coin at a point for causing the coin to close the circuit of said motor, a second pivotally mounted lever having one of its arms pivotally connected to an arm of the first mentioned lever, a spring engaging the other arm of said second mentioned lever for normally retaining the first mentioned lever with its coin engaging arm in the path of movement of the coin, means actuated by the motor for moving the spring engaged end of said second mentioned lever for releasing the coin, a hand operated lever, link connections between the hand operated lever and the pivotally connected levers for causing the coin retaining arm to be moved out of coin engaging position when the hand operated lever is manipulated, means controlled by the presence of a coin sustained by the said coin sustaining arm for locking the hand operated lever against operation when a coin is sustained by said arm, and means for releasing the said lock and permitting operation of the hand operated lever when the coin is released by the coin sustaining means.

14. In a mechanism of the class described, the combination with operating means and an electric motor for actuating the same, of a three-arm lever pivoted at the point of juncture of the three arms, a coin chute extending past the pivot of said lever and formed with an aperture into which one of the arms of the lever is adapted to be projected at times, another of the said arms being adapted at times to sustain the coin passing through the chute, a hand operated lever, connections between the hand operated lever and the third of said lever arms whereby movement of the said hand operated lever is adapted to move said three-arm lever for causing the coin sustaining arm to move out of a coin sustaining position and the first mentioned arm to be projected into the aperture in the chute, and a finger extending from said hand operated lever into said chute and arranged to be moved out of the path of movement of a coin in said chute when the hand operated lever is manipulated.

15. In a mechanism of the class described, the combination with a movably mounted frame and an electric motor for actuating the same, of a pair of circuit breaking devices interposed in the circuit of said motor, a revolubly mounted cam, means actuated by said frame for revolving the cam, means actuated by the cam at the conclusion of each revolution thereof for manipulating one of said circuit breaking devices, a crank arm, means actuated by the frame for revolving the same, means actuated by the said arm at the completion of each revolution thereof for manipulating the other of said circuit breaking devices for breaking the circuit, the actuating mechanism for said crank arm being timed with respect to the actuating mechanism for said cam for completing the revolution of the crank arm, when the cam has completed one half of a revolution, and for completing a revolution of the cam when the crank arm has completed a one half revolution.

16. In a device of the class described, an operating mechanism, means whereby the introduction of a coin applies operating energy and thereby puts the operating mechanism in motion, means controlled by the operating mechanism adapted to interrupt the operating energy, means to manually again apply the operating energy without displacing the coin and mechanically operated means to again interrupt the energy.

17. In a device of the class described, an operating mechanism, means whereby the introduction of a coin applies electrical energy and thereby puts the operating mechanism in motion, means controlled by the operating mechanism adapted to interrupt the electrical current, means to manually again start the electrical current without displacing the coin and means operated by the mechanism to discharge the coin.

18. In an apparatus of the class described, an operating mechanism, an open electric circuit adapted when closed to energize the operating mechanism and embodying spaced contacts, means whereby the introduction of a coin bridges the contacts and closes the circuit, a switch interposed in the circuit, means operated by the mechanism adapted to open the switch the coin continuing to bridge the contacts, means permitting the manual closing of the switch and mechanically operated means to interrupt the energy at the completion of operation.

19. In a device of the class described, an operating mechanism, an open electric circuit adapted when closed to energize the operating mechanism and embodying spaced contacts, means whereby the introduction of a coin bridges the contacts and closes the circuit, a switch interposed in the circuit, means operated by the mechanism at the end of a fixed cycle of operation and adapted to open the switch the coin continuing to bridge the contacts, means permitting the manual closing of the switch and means to release the coin from the contact at the end of another fixed cycle of operation.

20. In a device of the class described, an operating mechanism capable when actuated of performing a complete series of operations, means whereby a coin is positioned to apply energy to the operating mechanism, means whereby the energy is interrupted by the mechanism when one complete performance is accomplished and without displacing the coin, means to again manually apply the energy and means controlled by the mechanism adapted to release the coin when another complete performance is accomplished.

21. In a device of the class described, an operating mechanism capable when actuated of performing a complete series of operations, means controlled by a coin adapted to apply energy to the operating mechanism, means whereby the energy is interrupted by the mechanism when one complete performance is accomplished and without displacing the coin, means to again manually apply the energy through the means controlled by the coin and mechanism adapted to interrupt the energy.

22. In a device of the class described, an operating mechanism capable of being actuated electrically, to perform a complete series of operations, an open electric circuit, means whereby a coin is positioned to apply the electrical energy to the operating mechanism, means whereby the energy is interrupted by the mechanism when one complete performance is accomplished and without displacing the coin, means to again manually apply the electrical energy and mechanism adapted to automatically interrupt the energy when a like series of operations has been accomplished.

23. In a device of the class described, an operating mechanism capable of being electrically actuated to perform a complete series of operations, means whereby a coin is positioned to apply the electrical energy to the operating mechanism, means whereby the energy is interrupted by the mechanism when one complete performance is accomplished and without displacing the coin, means to again manually apply the electrical energy through the coin positioning means and means to release the coin.

24. In a device of the class described, an operating mechanism capable of being electrically actuated to perform a complete series of operations, means whereby a coin is positioned to conduct the electrical energy to the operating mechanism, means whereby the energy is interrupted by the mechanism when one complete performance is completed and without displacing the coin, means to again manually apply the energy through the coin and means to release the coin.

25. In a device of the class described, an operating mechanism capable of being electrically actuated to perform a complete series of operations, means whereby a coin is positioned to conduct the electrical energy to the operating mechanism, means whereby the energy is interrupted by the mechanism when one complete performance is accomplished and without displacing the coin, means to again manually apply the electrical energy through the coin in its original position and means to change the position of the coin.

In testimony whereof I affix my signature in presence of two witnesses.

CHARLES F. BURKHART.

Witnesses:
    LAURA A. SHUGRUE,
    W. SPEIDEL.